US006873759B2

(12) United States Patent
Fouquet

(10) Patent No.: US 6,873,759 B2
(45) Date of Patent: Mar. 29, 2005

(54) SYSTEMS AND METHODS FOR OPTICALLY DELAYING OPTICAL SIGNALS

(75) Inventor: Julie Fouquet, Portolla Valley, CA (US)

(73) Assignee: Agilent Technologies, Inc., Palo Alto, CA (US)

( * ) Notice: Subject to any disclaimer, the term of this patent is extended or adjusted under 35 U.S.C. 154(b) by 131 days.

(21) Appl. No.: 10/217,829

(22) Filed: Aug. 12, 2002

(65) Prior Publication Data

US 2004/0028324 A1 Feb. 12, 2004

(51) Int. Cl.⁷ .............................. G02B 6/25; G02B 6/35; H04J 14/00
(52) U.S. Cl. ............................... 385/27; 385/9; 385/40; 385/22; 385/1; 385/122; 398/53; 398/102; 398/FOR 131
(58) Field of Search .................. 398/53, 102, FOR 131; 385/122, 27, 1–3, 8, 39–41, 5, 22, 20, 21, 14–17, 9, 49–50, 31; 349/196–197

(56) References Cited

U.S. PATENT DOCUMENTS

| 5,018,816 | A | | 5/1991 | Murray et al. | |
|---|---|---|---|---|---|
| 5,058,973 | A | * | 10/1991 | Refregier et al. | 385/27 |
| 5,854,866 | A | * | 12/1998 | Leonard | 385/39 |
| 6,292,605 | B1 | * | 9/2001 | Bisson et al. | 385/24 |
| 6,570,684 | B1 | * | 5/2003 | Stone et al. | 398/45 |
| 2001/0022878 | A1 | * | 9/2001 | Saida et al. | 385/27 |
| 2002/0054726 | A1 | * | 5/2002 | Fondeur et al. | 385/15 |
| 2002/0186919 | A1 | * | 12/2002 | Pepper | 385/27 |

* cited by examiner

*Primary Examiner*—Edward J. Glick
*Assistant Examiner*—Krystyna Suchecki

(57) ABSTRACT

Optical systems are provided. One such system includes an optical transmission path that is defined, at least partially, by a variable optical delay system. The variable optical delay system incorporates a variable refractive index component that is arranged to receive an optical signal. The variable optical delay system provides a control input to adjust a refractive index of the variable refractive index component so that latency of the optical signal can be altered. Methods and other systems also are provided.

20 Claims, 4 Drawing Sheets

SYSTEMS AND METHODS FOR OPTICALLY DELAYING OPTICAL SIGNALS

BACKGROUND OF THE INVENTION

1. Field of the Invention

The present invention generally relates to optics. In particular, the invention relates to systems and methods for providing optical time delays to optical signals.

2. Description of Related Art

Much of modern progress is associated with the increasing prevalence of computers and related devices. As computers have become interconnected, e.g., via the Internet, they place increasing demand on communications systems for additional bandwidth. In response to this demand, there has been a trend to replace electrical communication channels with optical channels. Concomitantly, there has been a drive to develop optical counterparts to electrical-based communication devices. For example, optical fiber was developed for propagating optical signals, whereas copper wire has been used for propagating electrical signals.

As is known, packet-switching networks divide data into packets that can be communicated separately. The electrical switches that implement routing for each packet typically store each packet while a header of the packet is read. In particular, the header of a packet includes information corresponding to the intended destination of the packet. Therefore, by reading the header, routing of the packet can be determined.

Conventionally, electrical memory devices are used to store a packet while the header of the packet is read and to delay the packet until an appropriate channel becomes available for routing the packet. However, converting an optical signal to and from electrical form so that the packet can be stored by an electrical memory device adds delay to the switching operation. Thus, a packet may be delayed for a longer period of time than that required for routing. Additionally, converting an optical signal to and from electrical form adds to expense, e.g., component expense associated with demultiplexing the optical signal, discretely delaying each of the constituent signals, and re-multiplexing the signals.

Therefore, it should be appreciated that there is a need for improved systems and methods that address the aforementioned and/or other perceived shortcomings of the prior art. For instance, what is needed are systems and methods for achieving more precise control of packet delays so that communications throughput can be enhanced.

SUMMARY OF THE INVENTION

The present invention involves optically delaying optical signals. In particular, systems and methods in accordance with the invention use components that exhibit indexes of refraction that can be changed. Since the speed of light is dependent upon the index of refraction of the material through which the light propagates, propagation delay of an optical data signal can be controlled by controlling the index of refraction of the material.

An optical system in accordance with the invention includes an optical transmission path that is defined, at least partially, by a variable optical delay system. The variable optical delay system incorporates a variable refractive index component that is arranged to receive an optical signal. The variable optical delay system provides a control input to adjust a refractive index of the variable refractive index component so that latency of the optical signal can be altered.

A method for delaying an optical signal propagating along an optical path in accordance with the invention includes: receiving the optical signal, and altering a refractive index of at least a portion of the optical path to alter a propagation delay of the optical signal.

Clearly embodiments of the invention may exhibit features and/or advantages in addition to, or in lieu of, those mentioned above. Additionally, other systems, methods, features and/or advantages of the present invention will be or become apparent to one with skill in the art upon examination of the following drawings and detailed description. It is intended that all such additional systems and/or methods be included within this description, be within the scope of the present invention, and be protected by the accompanying claims.

BRIEF DESCRIPTION OF THE DRAWINGS

Many aspects of the invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views

DETAILED DESCRIPTION

As will be described in detail here, the present invention involves delaying optical signals. In this regard, reference is made to FIG. 1, which is a schematic diagram depicting an embodiment of an optical system 10 in accordance with the present invention.

Figure 1:
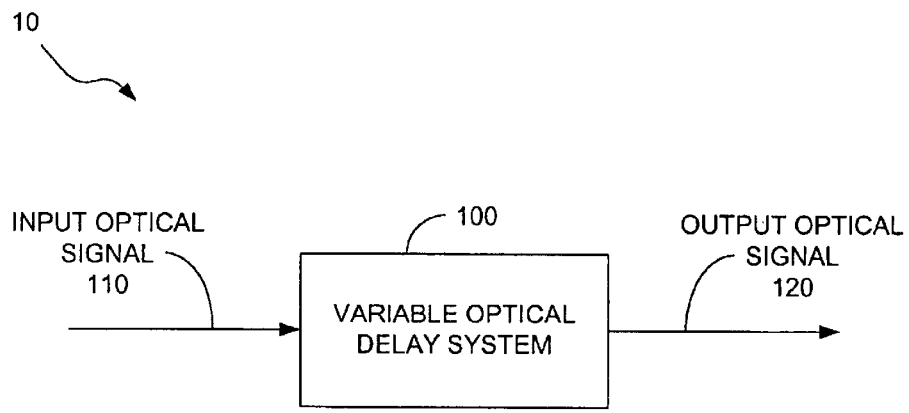
FIG. 1 is a schematic diagram of an optical system in accordance with the present invention.

As shown in FIG. 1, optical system 10 includes a variable optical delay system 100. Variable optical delay system 100 receives optical signals, such as input optical signal 110, and routes the optical signals to provide output signals, such as output optical signal 120. As will be described in greater detail later, variable optical delay system 100 is able to delay a received optical signal optically. Functionality of the variable optical delay system 100 of FIG. 1 will now be described with reference to the flowchart of FIG. 2.

Figure 2:
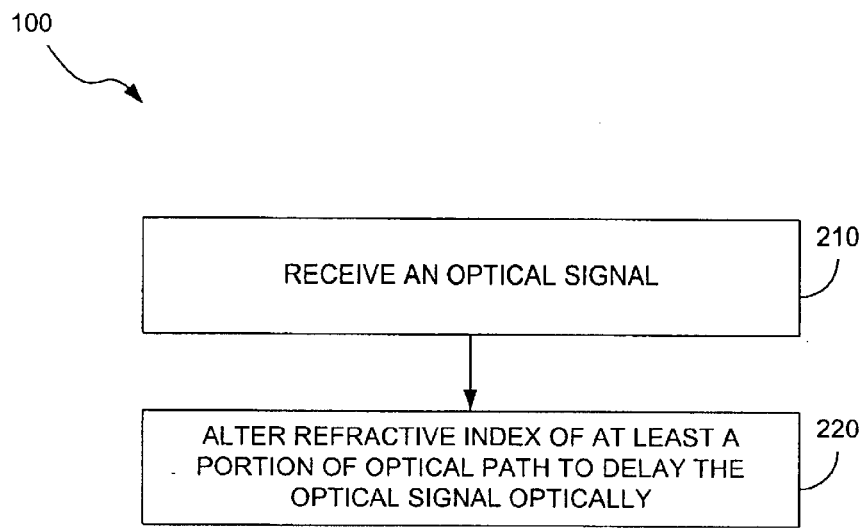
FIG. 2 is a flowchart depicting functionality of the variable optical delay system of FIG. 1.

As shown in FIG. 2, the functionality (or method) 100 may be construed as beginning at block 210, where an optical signal is received. In block 220, a refractive index of at least a portion of an optical path is altered. More specifically, at least a portion of the optical path through which the optical signal is to propagate is altered to exhibit a change in refractive index. This enables selected optical delays to be imparted to the optical signal.

Figure 3:
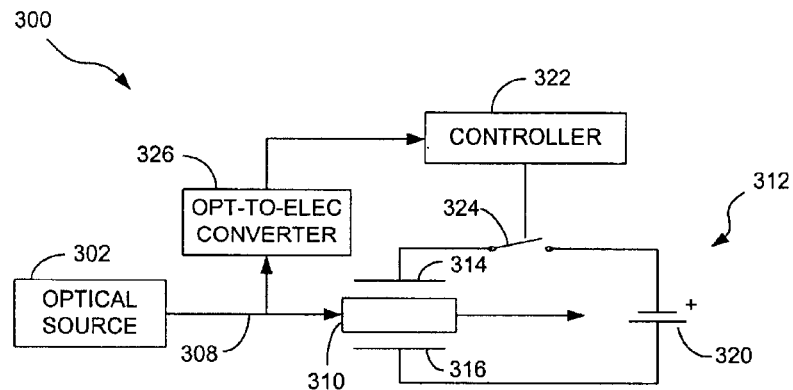
FIG. 3 is a schematic diagram of an embodiment of a variable optical delay system that can be used in the optical system of FIG. 1.

FIG. 3 is a schematic diagram of another embodiment of an optical system in accordance with the invention. In FIG. 3, optical system 300 includes an optical source 302. Note, optical source 302 can be selected from a variety of configurations including lasers, for example.

Optical system 300 defines an optical path 308 and includes a variable refractive index component 310 arranged along the optical path. Variable refractive index component 310 incorporates a material, the refractive index of which is capable of being changed. By way of example, the refractive index of the material may change in response to the application of an electric field. For ease of description, variable refractive index component 310 will be described as a liquid crystal cell, the refractive index of which is changed by applying or removing an electric field from the cell.

An electric field generator 312 applies an electric field across cell 310. More specifically, the liquid crystal cell 310 is arranged between plates 314 and 316 of the electric field generator. An electric field is generated by opposing electrical charges, provided from electrical source 320, accumulating on the plates. The flow of electrical charges from the electrical source to the plates is initiated by controller 322 providing a control input for actuating switch 324.

Controller 322 receives electrical signals from an optical-to-electrical converter 326. Optical-to-electrical converter 326 receives portions of the optical signals propagated along optical path 308 and converts the received portions of the optical signals to electrical signals. The controller 322 analyzes the electrical signals and provides a control input to the switch 324. Note, controller 322 can be implemented in software, firmware, hardware, or a combination thereof.

Subjecting the liquid crystal material of cell 310 to an electric field causes a change in the refractive index of the cell, which changes the speed of the optical signals propagating through the cell. Consequently, since the cell is arranged along the optical path of optical signals 302, application of the electric field causes the propagation time of the optical signals through the optical time delay system 301 to change, e.g., the optical signals are optically delayed differently than that which would have occurred without changing the refractive index.

Figure 4:
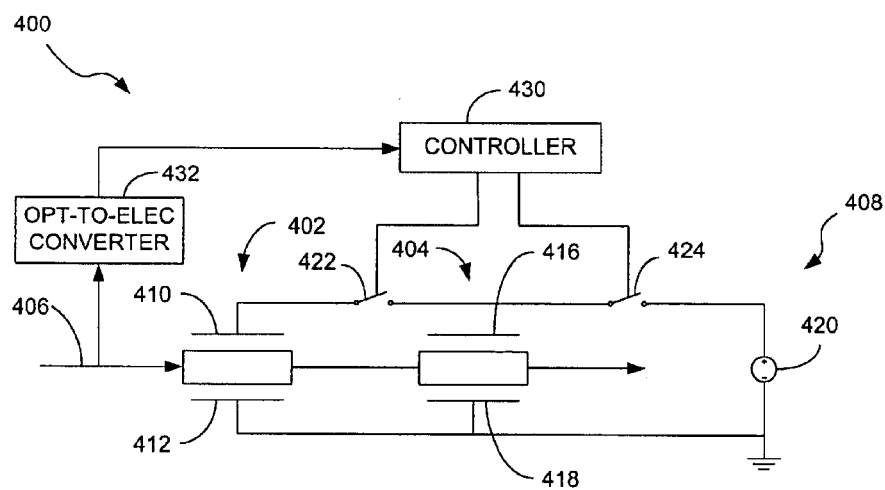
FIG. 4 is a schematic diagram of another embodiment of a variable optical delay system that can be used in the optical system of FIG. 1.

FIG. 4 illustrates another embodiment in accordance with the invention. In FIG. 4, optical system 400 includes two variable refractive index components, 402 and 404, that are arranged in series along an optical path 406. An electric field generator 408 applies an electric field selectively to one or more of the components 402, 404. More specifically, the electric field generator includes two pairs of plates 410, 412 and 416, 418 that are electrically coupled in series with a DC voltage source 420.

Switches 422 and 424, which control the flow of charges from DC voltage source 420, are selectively actuated by controller 430. In particular, controller 430 enables electric fields to be applied to none, either one, or both of the components 402, 404, based upon the respective switch positions. As shown in the embodiment of FIG. 3, an optical-to-electrical converter (432) converts portions of the optical signal into electrical signals for use by the controller.

Figure 5:
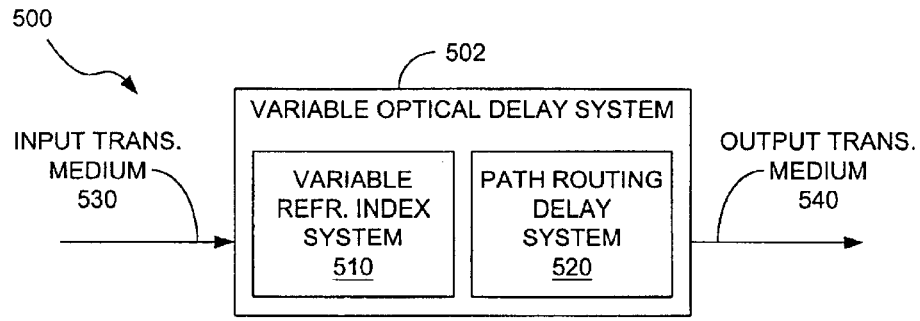
FIG. 5 is a schematic diagram of another embodiment of an optical system in accordance with the present invention.

Another embodiment of an optical system in accordance with the invention is depicted schematically in FIG. 5. As shown in FIG. 5, optical system 500 includes a variable optical delay system 502 that includes a variable refractive index system 510 and a path routing delay system 520. An input transmission medium 530 propagates optical signals to the variable optical delay system, and an output transmission medium 540 receives optical signals from the variable optical delay system.

Variable refractive index system 510 is used to impart selected optical delays to optical signals in manners similar to those described before with respect to FIGS. 3 and 4. In particular, variable refractive index system 510 alters the refractive index of a material through which the optical signals propagate in order to affect the propagation delay of the optical signals.

In contrast, path routing delay system 520 is used to impart selected optical delays to optical signals by directing the optical signals to various optical path segments (not shown in FIG. 5), each of which imparts a fixed optical delay to an optical signal. For instance, each of the optical path segments could be formed of the same material and exhibit a different length than that of another segment. Thus, each of the optical path segments would impart a different optical delay to an optical signal. In some embodiments, the routing system provides course delays to optical signals while the variable refractive index system is used to add fine delays. Functionality of optical system 500 is depicted in the flowchart of FIG. 6.

Figure 6:
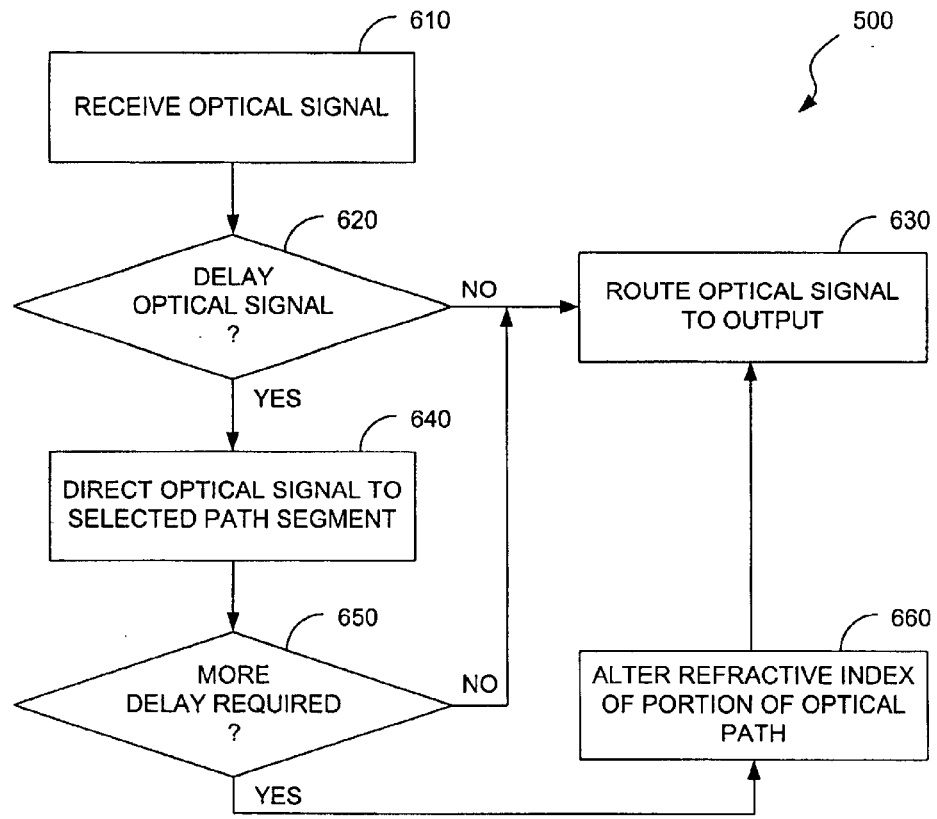
FIG. 6 is a flowchart depicting functionality of the variable optical delay system of FIG. 5.

As shown in FIG. 6, the functionality (or method) 500 may be construed as beginning at block 610, where an optical signal is received. In block 620, a determination is made as to whether the optical signal is to be delayed. By way of example, the optical signal may be delayed in order to read a header associated with a data packet carried by the optical signal. If it is determined that the optical signal does not require delaying, the process may proceed to block 630, where the optical signal is routed, i.e., the signal is provided to an output transmission medium. If, however, it is determined that delaying is required, the process may proceed to block 640.

In block 640, the optical signal is directed to an optical path segment which imparts a fixed optical delay to the optical signal. Typically, multiple optical path segments are provided, each of which is capable of imparting a different optical delay to an optical signal. Thus, optical delays of various durations can be imparted to the optical signal. In block 650, a subsequent determination can be made as to whether additional delaying of the optical signal is required. If it is determined that no further delaying is required, the process may return to block 630 (described before). If, however, it is determined that additional delaying is required, the process proceeds to block 660.

In block 660, the refractive index of a portion of the optical path along which the optical signal propagates can be altered. In particular, the refractive index of a portion of the optical path is altered to delay the optical signal. Thereafter, the process may proceed to block 630, where the optical signal is routed.

Figure 7:
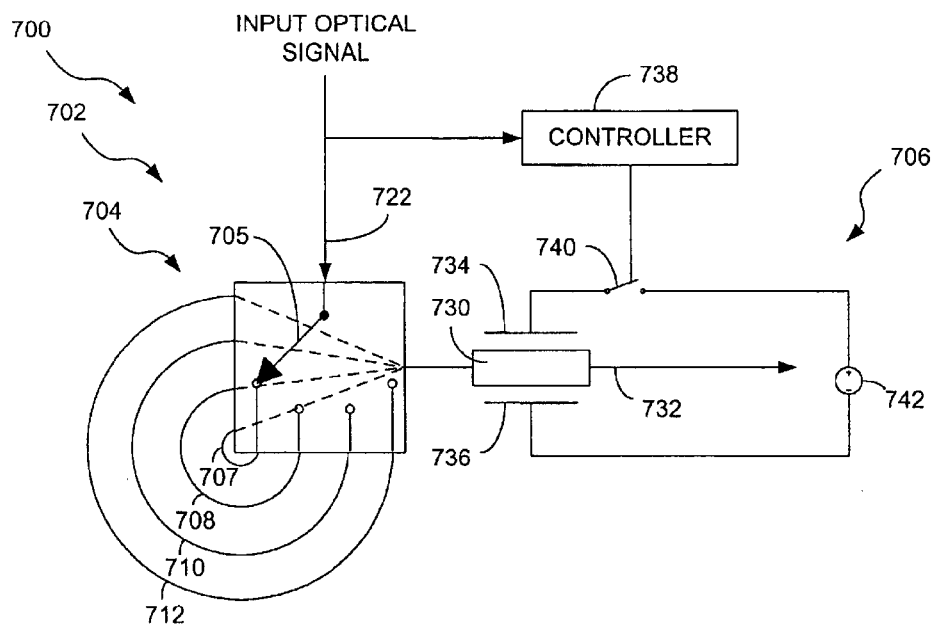
FIG. 7 is a schematic diagram of an embodiment of a variable optical delay system that can be used in the optical system of FIG. 5.

FIG. 7 is a schematic diagram depicting an embodiment of an optical system 700 in accordance with the invention that includes a variable optical delay system 702. The variable optical delay system incorporates a path routing delay system 704 and a variable refractive index system 706.

Path routing delay system 704 includes a switch 705 that selectively, optically communicates with multiple optical path segments, e.g., segments 707, 708, 710 and 712. Each of the segments imparts a different optical delay to an optical signal. In the embodiment of FIG. 7, each of the optical segments is shaped as a loop that is formed of optical fiber. Clearly, various other shapes and media can be used.

Switch 705 receives optical signals 720 via input transmission medium 722 and selectively routes the optical signal to one of the optical path segments. Depending upon the length of the segment selected, the optical signal is delayed by one of the four delays provided by the segments. The delayed optical signal may then be further delayed by the variable refractive index system 706.

Variable refractive index system 706 provides a selected delay to the optical signal by altering the refractive index of a portion of the optical path through which the optical signals propagate. In particular, the variable refractive index of portion 730 of optical path 732 is altered by application of an electric field. Plates 734 and 736 of an electric field generator are used to apply the electric field. This is accomplished by controller 738 actuating switch 740 so that charges from electrical source 742 can build on the plates. Note, in this embodiment, the signals provided to the controller are maintained in the optical domain.

Preferably, delay provided by the variable refractive index system 706 is more refined than that provided by the path routing delay system 704. Thus, the routing system can be used to provide coarse delays to optical signals, while the variable refractive index system 706 provides fine-tuning of the delay.

In some embodiments, optical signals can be routed through multiple paths segments of a path routing delay system. This can provide a range of delays for the optical signals. For instance, an embodiment can include path segments that impart 0.5 psec, 1 psec, 2 psec, 4 psec and 8 psec delays, respectively. Thus, by directing the optical signals through various combinations of the segments, various incremental optical delays are provided.

Figure 8:
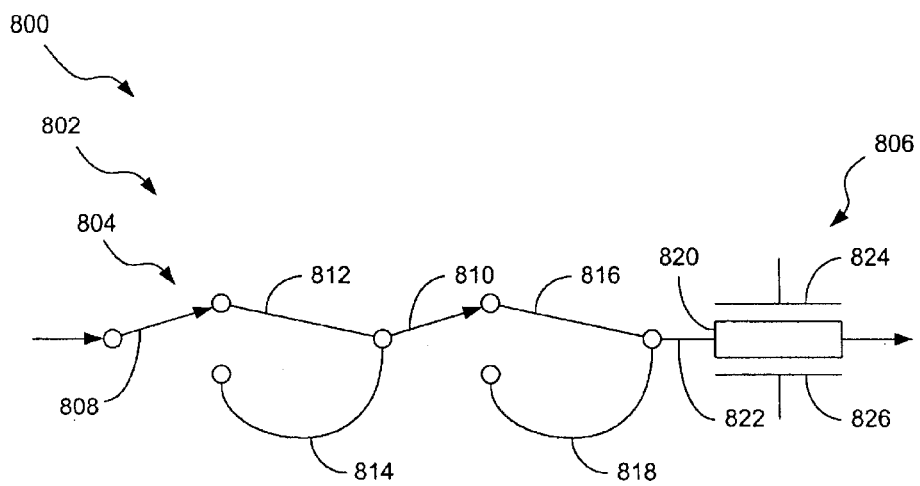
FIG. 8 is a schematic diagram of another embodiment of a variable optical delay system that can be used in the optical system of FIG. 5.

FIG. 8 is a schematic diagram depicting another embodiment of an optical system in accordance with the invention. In FIG. 8, optical system 800 includes a variable optical delay system 802 that incorporates a path routing delay system 804 and a variable refractive index system 806. The path routing delay system 804 includes switches 808 and 810 that optically communicate with each other in series. Each of the switches is able to direct an optical signal along alternative optical path segments. In particular, switch 808 can direct optical signals to either segment 812 or 814, and switch 810 can direct optical signals to either segment 816 or 818. Clearly, various other numbers of switches and/or segments per switch can be used.

Each segment associated with a switch typically is able to impart a different optical delay to an optical signal. In the embodiment of FIG. 8, one of the segments of each switch is relatively straight, while the other segment is curved. Since the segments are formed of similar optical fibers, the curved segments delay optical signals longer than the straight segments. Clearly, various other shapes and media can be used.

Variable refractive index system 806 receives optical signals from the routing system. The variable refractive index system 806 provides a selected delay to the optical signals by altering the refractive index of portion 820 of optical path 822. In particular, plates 824 and 826 are used to apply an electric field to portion 820, such as described before with respect to portion 730 of FIG. 7. Note, the controller(s) used for providing control inputs to the routing system and variable refractive index system have been omitted for ease of description.

The foregoing description has been presented for purposes of illustration and description. It is not intended to be exhaustive or to limit the invention to the precise forms disclosed. Modifications and/or variations are possible in light of the above teachings. The embodiments discussed, however, were chosen and described to provide illustration of the principles of the invention and its practical application to thereby enable one of ordinary skill in the art to utilize the invention in various embodiments and with various modifications as are suited to the particular use contemplated.

By way of example, embodiments of the invention have been described with respect to the use of liquid crystal cells, the refractive indexes of which are changed by alternately applying and removing electric fields. Various other materials, however, can be used. For instance, electro-optic materials such as electro-optic solids can be used. Examples of such solids include polymers and crystals. Materials, the indexes of refraction of which change when subjected to mechanical, thermal, and/or chemical influences, also can be used.

Note, propagation of optical signals may involve polarization dependency. Clearly, compensation techniques pertaining to polarization can be used by various embodiments of the invention. Additionally, the embodiments presented each include single inputs and single outputs for routing optical signals. Embodiments using various numbers of inputs and outputs can be used. Furthermore, electric field have been described with respect to using plates, however, various other structures such as electrodes could be used. All such modifications and variations are within the scope of the invention as determined by the appended claims when interpreted in accordance with the breadth to which they are fairly and legally entitled.

What is claimed is:

1. An optical system comprising:
   a variable optical delay system including a variable refractive index component arranged to receive an optical signal, said variable optical delay system being operative to provide a control input to adjust a refractive index of said variable refractive index component such that latency of the optical signal is altered when the optical signal propagates through the variable refractive index component; and
   a routing system operative to provide a selectable, fixed delay upon the optical signal propagating through the routing system, the routing system comprising:
   multiple optical path segments configured to provide a plurality of fixed delays; and
   a routing switch operative to route the optical signal through a selected one of said multiple optical path segments.

2. The optical system of claim 1, wherein said variable refractive index component comprises:
   an electro-optical material arranged to receive the optical signal.

3. The optical system of claim 2, wherein said electro-optical material is a liquid crystal.

4. The optical system of claim 3, wherein said variable refractive index component further comprises:
   an electric field generator electrically coupled to said liquid crystal and being operative to apply an electric field to said liquid crystal.

5. The optical system of claim 4, wherein at least one of said multiple optical path segments is configured as an optical loop.

6. The optical system of claim 4, wherein said variable refractive index component is arranged downstream of said multiple optical path segments.

7. The optical system of claim 4, wherein said multiple optical path segments are formed of the same material and each of said multiple optical path segments exhibits a different length such that each of said multiple optical path segments provides a different optical delay to the optical signal propagating therethrough.

8. The optical system of claim 4, wherein said routing system includes a matrix switch, said matrix switch having multiple inputs and multiple outputs, each of said multiple optical path segments optically communicating with a corresponding one of said inputs and a corresponding one of said outputs.

9. The optical system of claim 8, wherein said variable refractive index component optically communicates with one of said outputs of said matrix switch.

10. The optical system of claim 9, wherein said matrix switch is operative to propagate the optical signal selectively to said multiple optical path segments for providing coarse optical delays to the optical signal and to propagate the optical signal to said variable refractive index component for providing less coarse optical delays.

11. The optical system of claim 1, wherein said variable optical delay system comprises:
  multiple optical path segments; and
  means for selecting at least one of said optical path segments for propagating the optical signal.

12. The optical system of claim 1, wherein said variable refractive index component is a first variable refractive index component; and
  wherein said variable optical delay system further comprises:
  a second variable refractive index component optically communicating in series with said first variable refractive index component.

13. The optical system of claim 1, further comprising:
  an optical source optically communicating with said optical transmission path for providing the optical signal.

14. The optical system of claim 1, wherein the routing switch is operative to route the optical signal through a first selected one of optical path segments at a first instance of time, a second selected one of optical path segments at a second instance of time, and a third selected one of optical path segments at a third instance of time.

15. A method for delaying an optical signal propagating along an optical path, said method comprising:
  receiving the optical signal;
  using the received optical signal to generate a control signal, the control signal being used to alter a refractive index of at least a portion of the optical path to alter a first propagation delay of the optical signal;
  providing multiple optical path segments, each of the multiple optical path segments being selectable to optically communicate with the optical path; and
  switching the received optical signal through a selected one of the multiple optical path segments to provide a second optical delay of the optical signal.

16. The method of claim 15, wherein each of the multiple optical path segments exhibits a different optical delay.

17. An optical delay system comprising:
  a variable refractive index system operative to provide a variable delay upon an optical signal propagating through the variable refractive index system, wherein the variable refractive index system comprises:
  a variable refractive index component wherein the variable delay is proportional to an electric field that is applied upon the variable refractive index component through an actuating switch; and
  a controller configured to selectively operate the actuating switch.

18. The system of claim 17, wherein the optical signal is processed to provide a signal to the controller whereupon the controller selectively operates the actuating switch.

19. The system of claim 18, wherein processing the optical signal comprises an optical-to-electrical conversion.

20. The system of claim 17, further comprising:
  a routing system operative to providing a selectable, fixed delay upon the optical signal propagating through the routing system, the routing system comprising:
  a plurality of optical path segments configured to provide a plurality of fixed delays; and
  a routing switch operative to route the optical signal through one of the plurality of optical path segments.

* * * * *